United States Patent [19]

Uomini

[11] Patent Number: 6,018,761
[45] Date of Patent: Jan. 25, 2000

[54] SYSTEM FOR ADDING TO ELECTRONIC MAIL MESSAGES INFORMATION OBTAINED FROM SOURCES EXTERNAL TO THE ELECTRONIC MAIL TRANSPORT PROCESS

[75] Inventor: Robert Uomini, Kensington, Calif.

[73] Assignee: The Robert G. Uomini and Louise B. Bidwell Trust, Kensington, Calif.

[21] Appl. No.: 08/766,548

[22] Filed: Dec. 11, 1996

[51] Int. Cl.$^7$ .............................. G06F 13/33; G06F 15/17
[52] U.S. Cl. ............................ 709/206; 709/218
[58] Field of Search ........................ 395/200.36, 200.37, 395/200.47, 200.48, 200.49; 709/206, 207, 217, 218, 219

[56] References Cited

U.S. PATENT DOCUMENTS

| | | | |
|---|---|---|---|
| 5,418,908 | 5/1995 | Keller et al. | 395/200 |
| 5,790,793 | 8/1998 | Higley | 295/200.48 |
| 5,793,972 | 8/1998 | Shane | 395/200.49 |

OTHER PUBLICATIONS

Mark R. Brown, Special Edition Using Netscape 2 (2d ed.), pp. 197–211, 1995.
Mark R. Brown, Special Edition Using Netscape 2 (2d ed.), pp. 334, 337–341, 1995.
The Computer Information Centre (CompInfo), http://www.compinfo.co.uk/info–me.htm, 1996–98.
Dawson F., Howes, T., "*An Application/Directory MIME Content–Type Electronic Business Card,*" (Jun., 1996) pp. 1–21, located at http://ds.internic.net/internet–drafts/draft–ietf–asid–mime–vcard–00.txt.

"What is LiveForm?,"© 1996 Patil Systems, Inc., 1 page, located at http://www.patils.com/liveform.htm.

"*vCard The Electronic Business Card Version 2.1,*" Aversit Consortium Specification, Sep. 18, 1996, pp. x–xi, 27–30.

"*vCard The Electronic Business Card Version 2.1—Revolutionizing Personal Communication,*" A versit Consortium Specification, Sep. 18, 1996, pp. 1–6, located at http://www.versit.com/pdi/vcrdwht.html.

*Primary Examiner*—Mark H. Rinehart
*Attorney, Agent, or Firm*—Philip H. Albert; Townsend and Townsend and Crew LLP

[57] ABSTRACT

An apparatus and method is provided for obtaining message context information regardless of whether or not the sender includes context information, such as full name, address, telephone number, etc. The context can be stored separately from a message and retrieved when the message is read by a recipient when requested. The context might be stored in an indexed database or repository using either a key field provided by the sender or using the fields present in the message for other purposes. The latter approach is useful for finding context information in legacy messages and messages where the sender has taken no action to supply context information. If a key field is not provided by the sender, the "From:" and "Organization:" header fields can be used. In order to populate the database or repository, the domain name portion of the "From:" header field can be used as an index into a "whois" search and the "Organization" name can be passed to a telephone book search engine.

3 Claims, 4 Drawing Sheets

---

```
From: uomini@fractals.fractals.com
Subject: New Computers for Sale
Organization: The Fractal Images Company
X-Primary-Context-Source: http://www.fractals.com/uomini@fractals.fractals.com/.context
Date: Thu, 7 Nov 1996 15:45:40 GMT
To: Buyer@nullsite.com We have computers for sale! Come on by and see them.
```
44

```
From: uomini@fractals.fractals.com
Subject: New Computers for Sale
Organization: The Fractal Images Company
X-Context-Business-Info: Kensington:CA
X-Context-User-Info: Robert:Uomini:Kensington:CA
Date: Thu, 7 Nov 1996 15:45:40 GMT
To: Buyer@nullsite.com We have computers for sale! Come on by and see them.
```
48

```
                                    42
┌────────────────────────────────────────────────────────┐
│ From: uomini@fractals.fractals.com                     │
│ Subject: New Computers for Sale                        │
│ Organization: The Fractal Images Company               │
│ Date: Thu, 7 Nov 1996 15:45:40 GMT                     │
│ To: Buyer@nullsite.com                                 │
│                                                        │
│ We have computers for sale!  Come on by and see them.  │
│                                                        │
└────────────────────────────────────────────────────────┘
```

Fig. 2(a) PRIOR ART

```
                                    44
┌────────────────────────────────────────────────────────────────────────────────┐
│ From: uomini@fractals.fractals.com                                             │
│ Subject: New Computers for Sale                                                │
│ Organization: The Fractal Images Company                                       │
│ X-Primary-Context-Source: http://www.fractals.com/uomini@fractals.fractals.com/.context │
│ Date: Thu, 7 Nov 1996 15:45:40 GMT                                             │
│ To: Buyer@nullsite.com                                                         │
│                                                                                │
│ We have computers for sale!  Come on by and see them.                          │
│                                                                                │
└────────────────────────────────────────────────────────────────────────────────┘
```

Fig. 2(b)

```
                                    48
┌────────────────────────────────────────────────────────────┐
│ From: uomini@fractals.fractals.com                         │
│ Subject: New Computers for Sale                            │
│ Organization: The Fractal Images Company                   │
│ X-Context-Business-Info: Kensington:CA                     │
│ X-Context-User-Info: Robert:Uomini:Kensington:CA           │
│ Date: Thu, 7 Nov 1996 15:45:40 GMT                         │
│ To: Buyer@nullsite.com                                     │
│                                                            │
│ We have computers for sale!  Come on by and see them.      │
└────────────────────────────────────────────────────────────┘
```

Fig. 2(c)

SYSTEM FOR ADDING TO ELECTRONIC MAIL MESSAGES INFORMATION OBTAINED FROM SOURCES EXTERNAL TO THE ELECTRONIC MAIL TRANSPORT PROCESS

BACKGROUND OF THE INVENTION

The present invention relates to an electronic mail message system and more particularly to a system for attaching information about mail messages to the mail messages.

Electronic mail ("e-mail") is the application which drives users to the Internet and other on-line networks. Each year, billions of messages are transported between friends, business acquaintances, junk e-mailers, members of mailing lists and even total strangers. On the Internet, electronic mail messages generally conform to the consensually agreed upon standards. These standards are set out in documents referred to as "Requests For Comments" or RFC's. The RFC's applicable to e-mail messages include RFC 822 and others.

In general, an e-mail message is made up of a header section containing a plurality of header fields and a message body. Each header field has a field name and a field value, separated by a delimiter between the field name and the field value and a delimiter between header fields. For example, the header field "From: name@domain" has a field name of "From:" and a value of "name@domain". This particular header field indicates that the message is from a person or machine known at the host machine "domain" as "name". Other fields provide other information about the message or the author.

At minimum, a message should have "From:", "To:", "Subject:" and "Date:" header fields. Often, header fields are added to a message to assist with understanding the message or troubleshooting transmission errors. For example, a "Message-Id:" or "Received:" header field could be used to diagnose transmission problems if messages are not being received correctly. A "Received:" header field is typically added at each node which receives and forwards the message, so that when the message finally arrives at its destination, it has a log of how it got there. If the message body is not simple text, it might include a "Content-Type:" header field to indicate how the message should be interpreted.

Since a mail message can be transported with no more context than the e-mail address of the sender and the e-mail address of the receiver, the recipient of the message might not recognize the sender, even where they know each other well. For example, even if Alice Jones and Bob Benson talked frequently, Alice might not recognize a message from "bb1023@smtp.dgrlu.edu". The sender can avoid this problem in several ways.

If the sender, Bob, has a say in what name is assigned to him, he can select a better name, such as "bob_smith". Administrators of large systems will not always allow Bob to have whatever name he wants, either because the names must comply with some consistent naming scheme or the desired name has already been assigned to someone else. This problem has been addressed by the RFC's in that a sender's full name, which need not be unique or easily parsable, can be included in a header field. An example of this is the header field "From: Bob Smith <bb1023@smtp.dgrlu.edu>".

The use of full name would be sufficient to provide Alice with a context for the message, since Alice knows Bob, but would not help if Alice didn't know a Bob Smith. If desired, Bob can include an "Organization:" header field to indicate an association with which Alice might be familiar. If the sender's company handles all of the outgoing mail messages, the company's host machine might add the "Organization:" header field to each outgoing message to facilitate this process.

Where the sender cannot control the sender's e-mail address or the headers used, the sender can include a "signature block" at the end of his or her message. By convention, the signature block is four lines or less giving the context of the sender. A typical signature block contains the sender's full name, company name, telephone number, address, etc. Of course, since the signature block is free form text, many senders get creative and include long signature blocks which might include character-based artwork, quotes, jokes, disclaimers, etc.

Context is important in a message where the communication depends on where the sender and recipient are physically located. If a merchant offers goods or services by e-mail, recipients might need to know where the merchant is physically located before deciding whether that merchant can be patronized as a practical matter. By remembering to include an address, the merchant can provide the necessary context. Many different kinds of context are needed, but the need for physical location context is made more important by the fact that the Internet is a global network.

One solution to the problem of context is to include a standardized block of data with each message, i.e., an electronic business card. Such a scheme is described in an Internet Draft entitled "An Application/Directory MIME Content-Type Electronic Business Card Profile" (file name: draft-ietf-asid-mime-vcard-00.txt). Therein, a type of message attachment referred to as a "vCard" is described. A vCard can be attached to an e-mail message, or can be used outside of a mail system, to present a user's "business card" data in a standardized format. "Business card" data is that data which normally appears on a business card, such as name address, telephone number, alternate number, e-mail address, picture, etc., as well as other identifying information which might be added to a business card when it becomes an electronic business card, such as a video or audio clip. To provide context, the sender of a message would attach his or her vCard to the message. The vCard could then be viewed by the recipient.

One disadvantage of many of the above methods of providing sender context is that the sender must use them, otherwise no context is provided. Even if the context was provided in every message, network bandwidth would be wasted sending the extra context information repeatedly. What is needed is a system for obtaining context for a message without requiring the continual transport of this context information and without requiring that a context-providing action be taken by the sender each time.

SUMMARY OF THE INVENTION

The present invention provides an apparatus and method for obtaining message context information regardless of whether or not the sender includes context information. In one embodiment, context information is stored separately from a message and retrieved when the message is read by the recipient and the recipient requests the context information. The context information is found in an indexed database or repository using either a key field provided by the sender or using the fields present in the message for other purposes. The latter approach is useful for finding context information in legacy messages and messages where the sender has taken no action to supply context information.

Context information might include a full name, address, telephone number, World Wide Web ("Web") page location, geographic location, map showing directions, etc. If a key field is not provided by the sender, the "From:" and "Organization:" header fields can be used.

In order to populate the database or repository, the domain name portion of the "From:" header field can be used as an index into a "whois" search and the "Organization" name can be passed to a telephone book search engine.

A further understanding of the nature and advantages of the inventions herein may be realized by reference to the remaining portions of the specification and the attached drawings.

BRIEF DESCRIPTION OF THE DRAWINGS

FIG. 2(a), 2(b), 2(c), shows various message types; FIG. 2(a) shows a message where the sender did not provide any context hints; FIG. 2(b) shows a message where the sender provided a context pointer; and FIG. 2(c) shows a message where the sender provided context fields.

DESCRIPTION OF THE PREFERRED EMBODIMENT

Using the preferred embodiment described below, a recipient of an electronic mail message (herein "a mail message" or just "a message") can obtain a context for the message to learn further information about the sender of the message. Contexts are provided to the recipient transparently and automatically upon request and contexts can be obtained with or without the assistance of the sender. Preferably, all senders will send "context-aware" messages, but the system described herein can obtain context for context-unaware messages, albeit with a little more effort. The context itself can be included in each message, but because of bandwidth use, the preferred embodiment sends a reference to the context rather than all of the context.

Figure 1:
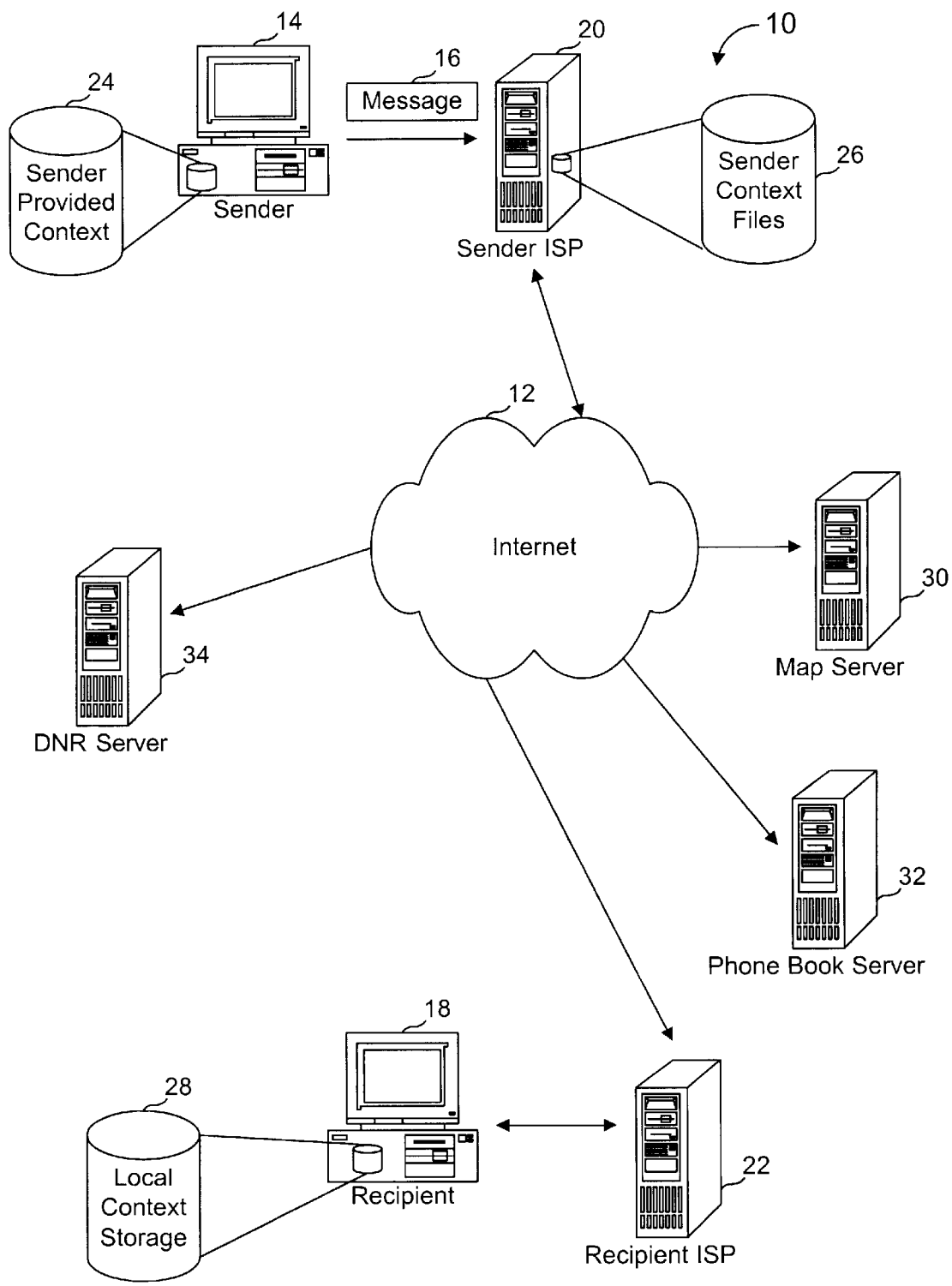
FIG. 1 is a schematic diagram of a network over which messages might be sent according to the present invention.

FIG. 1 is a schematic of the major elements of a computing system 10 used to create, transport and read messages, contexts and other data. Internet 12 is shown as the network interlinking the various elements of computing system 10, however it should be apparent that other public or private networks are equivalents to the Internet. Although many other actions might be taken by those elements, the action of interest is where a sender 14 sends a message 16 to a recipient 18.

It should be noted that there are many ways for sender 14 to send message 16 and many ways for recipient 16 to receive it. Sender 14 could have sent message 16 directly to recipient 16. Sender 14 could have sent message 16 to a mailing list to which recipient 16 is a subscriber. Sender 14 could have posted message 16 to a bulletin board or news group (although posted messages are generally not referred to as "mail", the invention applies just as well to posted messages). Also, sender 14 could either be a human sending mail messages at a keyboard and monitor or a machine sending messages according to the machine's programming and inputs. Recipient 16 could also be either a human or a machine. For simplicity, the "sender" and "recipient" of a message are machines and it will be assumed that the senders and recipients are either machines controlled by humans or by programs.

In particular, the transport mechanism shown in FIG. 1 is one that is in common use today. Sender 14 sends messages such as message 16 to a sender ISP (Internet Service Provider) 20 which transports the messages to a recipient ISP 22 via Internet 12. ISPs provide computers which are connected to Internet 12 all the time to receive data whenever it is sent. Using ISPs, the sender and recipient need not be up all the time. Typically, sender 14 connects to sender ISP 20 and downloads a batch of messages and then disconnects. The messages are then transmitted by sender ISP 20 to recipient ISP 22 which is also on-line all the time. Periodically, recipient 18 will connect to recipient ISP 22 to collect messages addressed to recipient 18.

Also shown in FIG. 1 as several repositories 24, 26 28 of context information. As will be apparent, only one repository is needed, if that repository has the needed context and is accessible to recipient 18. Repository 24 is located at sender 14, so it is only useful if recipient 18 can access it as desired, or if sender 14 extracts the context from repository 24 and sends it to recipient 18, usually as part of the message. A more convenient approach is for sender 14 to store its context in repository 26, which should be accessible at any time. Where sender ISP 20 is a Unix ®computing system, the sender context might be stored as a file named "context" in a specified directory on a host system which is always available, or can be stored on a primary or secondary WWW server for the sender. Another context repository is repository 28, which caches contexts which recipient 18 has already received or found. In the preferred embodiment, the sender's context is stored in repository 26, so that it is always up-to-date, is always accessible, and is not transmitted more than necessary.

FIG. 1 also shows several servers attached to Internet 12. These are a map server 30, a phone book server 32 and a DNR (Domain Name Registry) server 34. The use of these servers is described below in connection with FIGS. 2–4.

FIG. 2 shows several examples of messages which might be sent by sender 14. FIG. 2 shows a message 42 as might be sent by a sender as known in the prior art. From the message, the recipient can determine the date the message was sent, the e-mail address of the sender, the subject of the message and the organization to which the sender belongs. In this example, the message relates to computers for sale. If the recipient is going to be able to decide whether or not to follow up on the offer, the recipient, who might be located anywhere in the world, must have a context for the message, i.e., the recipient must know where the sender is located, how to get there, alternate means of contacting the sender by telephone or facsimile, etc. Obviously, if the sender desires a decent response to the invitation, the sender will not just send out message 42, since it is clear that proximity to the sender is a requirement for the invitation to have utility. Thus, we would expect the message to include more than just the invitation. However, with real world messages it is not always clear that a location is needed. For example, the sender might request responses by e-mail, but the recipient desires to respond by telephone. Furthermore, including the context as part of the message body wastes bandwidth as much as including the context information in a header or in a vCard attachment.

If the sender does not include any context hints or pointers, the recipient may still be able to locate context information, as described in connection with FIGS. 3–4. FIG. 2(b) shows a message 44 in which the sender included a pointer to a context file. The header field "X-Context-Source:" has a value of a URL (Uniform Resource Locator) pointing to a file containing the sender's context. If backup sources are contemplated, the header fields "X-Primary-Context-Source:" and "X-Secondary-Context-Source:" might be used. As described above, the context includes an address, possibly a telephone number, and similar data. However, it should be understood that the context can be any information which is useful to the recipient in understanding more about the sender. Context data can include one or more HTML pages, among other formats, and include any manner of personal or business information about the sender. One method in the prior art for sending limited amounts of context information is to include the sender's name, address and telephone number in a signature block at the end of the message body. Here, the signature is not necessary, since all of the signature data can be found in the context for the sender.

In the example of message 44 in FIG. 2(b), the context is in the form of a file on an HTTP (Hypertext Transport Protocol) server. Alternatively, the "X-Context-Source:" value could be a pointer to a database and a key field which can be used to retrieve a unique record from the identified database. For example, a commercial context providing service might offer senders a storage location equivalent to repository 26 for permanent context storage in the form of the sender's vCard. The service would then store many vCards in a database. The recipients could extract specific vCards for senders using a record number provided as part of the "X-Context-Source:" header field. Of course, anyone looking for a vCard, with or without knowing the record number could also search the database by keywords. In some embodiments, the context source field name is "X-Primary-Context-Source" whether or not a secondary context source is provided for.

FIG. 2(c) shows an example of a message 48 wherein hints are provided in the form of tag header fields. Each tag header field is associated with a particular data field used by a phone book database. In message 48, two tag header fields are present, "X-Context-User-Info:" and "X-Context-Business-Info:". These header fields are used, as described below, to find context from a phone book database, or to find a pointer to context information. If only one of these fields is present, a search can proceed with that one field. Where not all information in a field is found, it can be left blank, such as:

X-Context-User-Info: Robert:Uomini::CA which leaves the city element blank. In an alternate embodiment, each data element is on its own line, as in the header portion shown here:

X-Context-Org-City: Kensington

X-Context-Org-State: CA

X-Context-Sender-Firstname: Robert

X-Context-Sender-Lastname: Uomini

X-Context-Sender-City: Kensington

X-Context-Sender-State: CA

Figure 3:
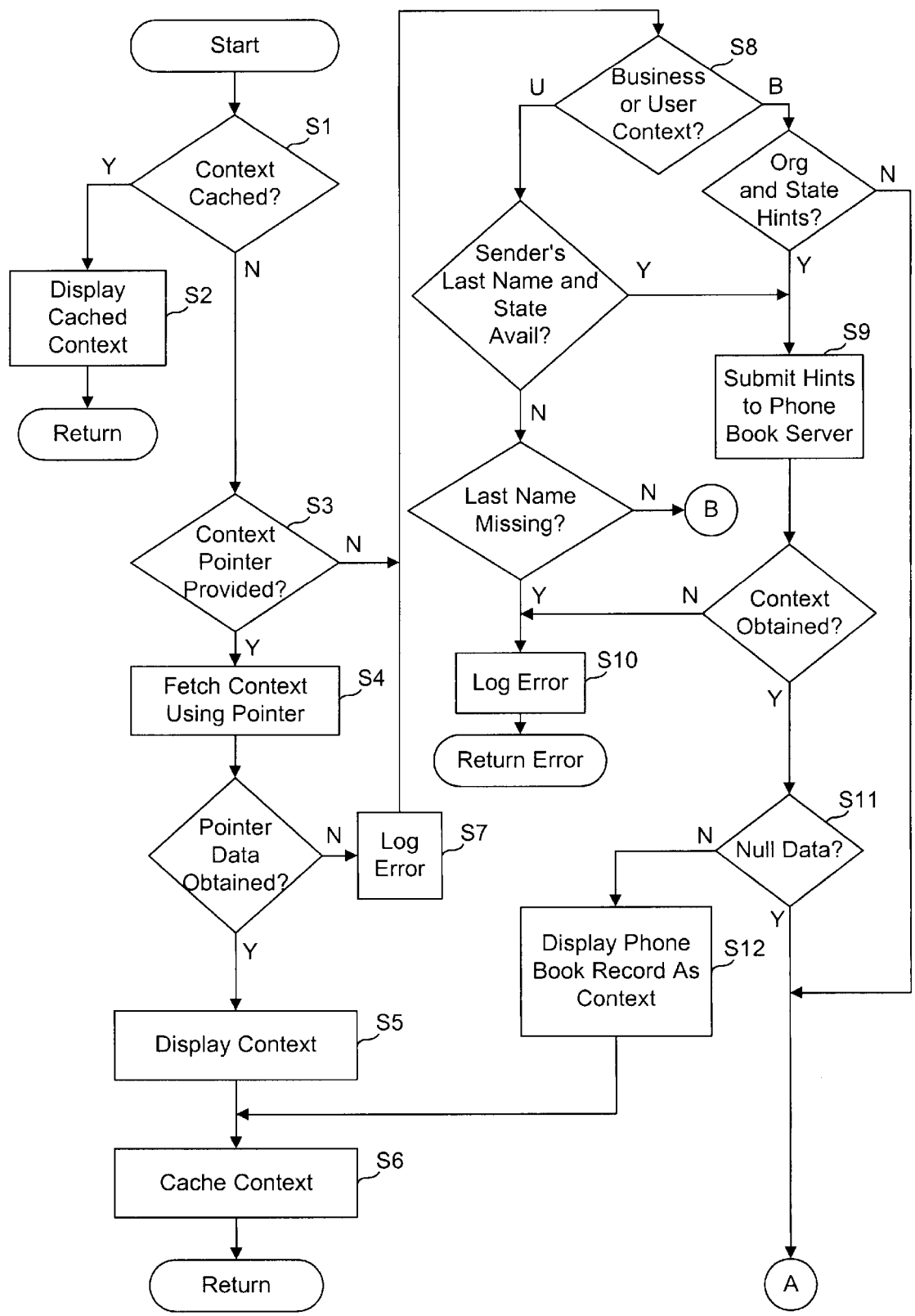
FIG. 3 is a flowchart illustrating a process of determining context for a mail message according to the present invention.
Figure 4:
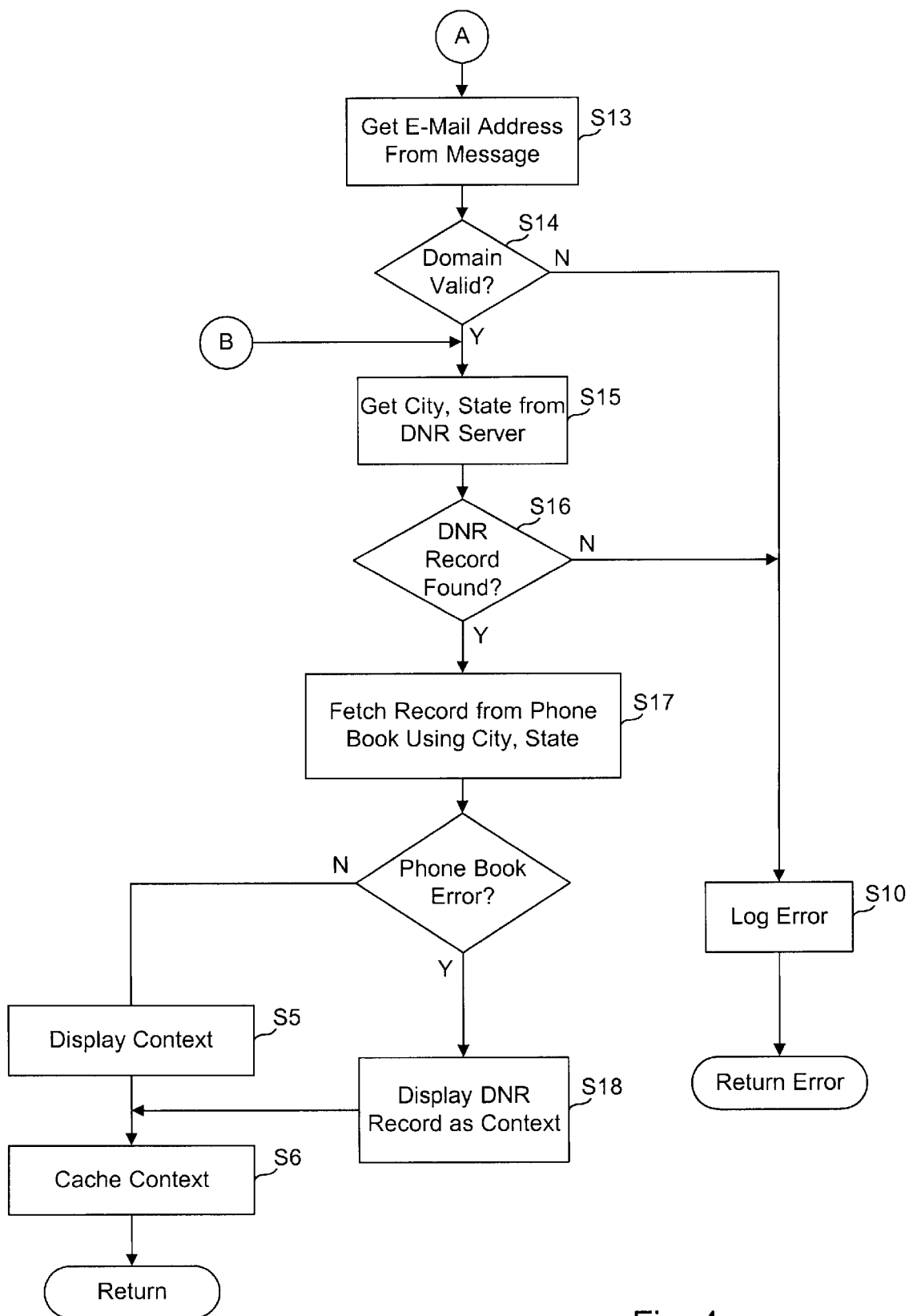
FIG. 4 is a flowchart continuation of FIG. 3.

Referring now to FIGS. 3–4, a flowchart of a context retrieval process is there shown. The steps of the flowchart, numbered from Si to S18, are performed in numerical sequence, except where noted. The process shown is used to obtain context information using data from the message, where the context information is at least partially obtained from a source external to the message. The process can be performed by recipient 18 (FIG. 1) for the messages shown in FIGS. 2(a)-(c). This process can either be performed automatically for each received message (not recommended where large numbers of messages are received) or can be performed only upon user request. Another possibility is that context is automatically retrieved only for messages meeting a filter criteria.

However the process is initiated, in step S1 the recipient (computer) determines whether a context has already been cached for the sender of the message. If a context has already been cached, that context is displayed (S2) and the process is complete. Of course, if context is automatically retrieved, it will likely not be displayed at this point, but held for display upon user request. If the context has not been cached, the message is scanned for a context pointer (S3). The context pointer is used to fetch the context information (S4) and if the context information is retrieved, it is displayed (S6) and cached (S7). If the context information cannot be fetched at step S4, an error is logged (S7) and the process continues at step S8. If a context pointer is not provided, the process also continues at step S8. A context pointer in the message shown in FIG. 2(b) is provided as an "X-Primary-Context-Source" header field. If the primary context source is not available and a secondary context pointer is indicated, then the context is obtained from the secondary source.

At step S8, the process determines whether the user wants context information for a business or a user. Either way, hints or other information from the message are submitted to a phone book server (S9). If user context is sought, the information submitted is the sender's last name and state, whereas if business context is sought, the organization and state are submitted. Where state is not required for a phone book search, or other data is required to limit the search, the data provided to the phone book server is adjusted accordingly. If the sender's last name or state cannot be found, a error is logged (S10) and the process terminates. If the last name is found, but not the state, the process continues as indicated by "B" (see FIG. 4). If the organization and state are not available for business context, the process continues as indicated by "AA" (see FIG. 4). The data submitted to the phone book server can either be information extracted from the message in fields unintended for that use, or the information could be extracted from "hint" fields included for this purpose, such as the "X-Context-User-Info" header field shown in the message in FIG. 2(c). The context is usually provided directly by the phone book server, but in some embodiments, the phone book server will provide a pointer to the context.

Either way, if the context is not found, the process continues with logging an error (S10) and terminating. If the context is found, but it is null (Sll), the process continues at point "A" (see FIG. 4). Otherwise, if the context is found and is not null, the context is displayed (S12) and cached (S6) to complete the process.

Referring now to FIG. 4, the process continues at point "A". This is the point usually reached here the message is not context-aware (i.e., it has no context pointers or context hints). Thus, even if the message is not context-aware or the context pointers or hints do not help, the recipient might still be able to obtain the context information based on just the information found in the message.

At step S13, the message is examined to determine if a sender mail address exists. The sender mail address is generally available in mail messages, but might not be present in some news postings. If the sender mail address is not available or the domain indicated in the address is not valid (S14), the process ends with an error message (S10) indicating that context cannot be found. If the sender's mail address is available and the domain is valid, the sender's city and state are fetched from the domain name record on a DNR server (S15). The fetching is also performed where the last name of the sender is available, but not his or her state (see "B" in FIGS. 3–4). If the domain record is not found (S16), the process returns with the error message (S10) and ends. However, if the domain record is found, the city and state of the domain holder are extracted from the domain record and used to fetch a record from the phone book server (S17). Of course, where the domain name is not unique to the sender's business, such as where the sender is using an account on a commercial ISP's system, the domain name would refer to the ISP, not the sender, so it shouldn't be used.

If there is a phone book server error, such as the phone book failing to find the context information, the DNR record is instead displayed (S18), when appropriate. Otherwise, the phone book server query results are used as the context information. Either way, the context information is cached. Of course, if a phone book server is used under and agreement or law which prohibits local storage of records retrieved from the phone book server, then the step of caching (S6) is skipped.

Context information can be obtained from message information in a variety of ways, typically depending on what search engines are available and what information is provided in the message. For example, if the recipient has access to a phone book server (such as server 32 shown in FIG. 1), that server can be used. One such server (http://zip2.com) accepts a name and a state and will return a list of matches. Thus, for this server, the recipient will want to know the sender's state.

The sender's state can be determined in a variety of ways. If the sender uses a domain in the ".us" top-level domain, the state can be extracted from the sender's e-mail address. If the sender included a signature block, it could be used to provide the state. Of course, given that the signature is free form, a complex parser would be needed to extract state from signatures. Alternatively, if none of the above prove useful, the sender's domain name could be submitted in a "whois" search.

If the context is found and stored (cached) in step S5, it might be stored in memory such as storage 28 shown in FIG. 1. If this is the case, steps S1 and S2 are performed using storage 28. However the context information is obtained, the context information can be presented to the recipient user upon request, and can also be used to retrieve a map and directions using a map server such as map server 30 shown in FIG. 1. An example of a map and directions server is the server found at http://zip2.com.

The above description is illustrative and not restrictive and many variations of the invention will become apparent to those of skill in the art upon review of this disclosure. For example, although separate servers are shown in FIG. 1, their functionality might be combined into a single server. The scope of the invention should, therefore, be determined not with reference to the above description, but instead should be determined with reference to the appended claims along with their full scope of equivalents.

What is claimed is:

1. A method of obtaining context information about a sender of an electronic message using a mail processing comprising the steps of:

scanning the message, usinig the mail processsine program to determine if the message contains a reference in a header portion of the message to at least one feature of the sender's context, wherein the sender's context is information about the sender or the message that is usefiul to the recipient in understanding more about the context in which the sender sent the message;

if the message contains such reference, using the mail processing program and such reference to obtain [sender] the context information from a location external to the message;

if the message does not contain such reference, using the mail processing program and information present in the message to indirectly obtain the [sender] context information using external reference sources to find a reference to the [sender] context information.

2. The method of claim 1, wherein the reference to at least one feature is a reference to a location where context information is stored.

3. The method of claim 1, wherein the reference to at least one feature is a hint usable to retrieve a location where context information is stored.

\* \* \* \* \*

UNITED STATES PATENT AND TRADEMARK OFFICE
CERTIFICATE OF CORRECTION

PATENT NO.     : 6,018,761                                          Page 1 of 1
DATED          : January 25, 2000
INVENTOR(S)    : Robert Uomini It is certified that error appears in the above-identified patent and that said Letters Patent is hereby corrected as shown below:

Column 3,
Lines 55, 57, 58 and 65, "recipient 16" should read -- recipient 18 --.

Column 5,
Line 60, "Si" should read -- S1 --.

Column 6,
Line 33, "a" should be -- an --.
Line 49, "Sll" should read -- S11 --.
Line 54, "here" should be -- where --.

Column 7,
Line 18, "and" should be -- an --.

Column 8,
Line 17, after "processing" insert -- program --.
Line 19, please delete "usinig" and insert -- using --.
Line 19, please delete "processine" and insert -- processing --.
Lines 29, 33 and 35, please delete each occurrence of "[sender]".

Signed and Sealed this

Fourteenth Day of January, 2003

JAMES E. ROGAN
*Director of the United States Patent and Trademark Office*